United States Patent
Ganser et al.

(10) Patent No.: US 6,182,411 B1
(45) Date of Patent: Feb. 6, 2001

(54) STRUCTURAL COMPONENT FOR VEHICLE FLOORING

(75) Inventors: Antje Ganser, Renningen; Alexander Koblischke; Peter Groche, both of Kaiserslautern, all of (DE)

(73) Assignee: Lear Corporation, Southfield, MI (US)

( * ) Notice: Under 35 U.S.C. 154(b), the term of this patent shall be extended for 0 days.

(21) Appl. No.: 09/248,050

(22) Filed: Feb. 10, 1999

(51) Int. Cl.$^7$ ........................................ E04B 5/02
(52) U.S. Cl. ...................... 52/480; 296/181; 296/182; 296/183; 296/204
(58) Field of Search .................. 296/181, 182, 296/183, 204; 52/480; 410/101, 106, 108, 109

(56) References Cited

U.S. PATENT DOCUMENTS

| | | | |
|---|---|---|---|
| 2,692,032 | * 10/1954 | Peterson | 189/34 |
| 3,080,021 | * 3/1963 | Muir | 189/34 |
| 4,906,021 | * 3/1990 | Rowe et al. | 280/789 |
| 5,143,418 | * 9/1992 | Fouquet | 296/182 |
| 5,575,525 | 11/1996 | Walworth, Jr. . | |

FOREIGN PATENT DOCUMENTS

| | | |
|---|---|---|
| 195 22 296 A1 | 1/1997 | (DE) . |
| 0 063 214 | * 10/1982 | (EP) . |
| 0 615 894 A1 | 3/1993 | (EP) . |
| 0 810 147 A2 | 4/1997 | (EP) . |

* cited by examiner

Primary Examiner—Carl D. Friedman
Assistant Examiner—Patrick J. Chavez
(74) Attorney, Agent, or Firm—Brooks & Kushman P.C.

(57) ABSTRACT

Indicated is a structural flooring component for vehicles which has a bottom plate (10) and a number of profile parts (20) for the attachment of equipment components to the floor. The bottom plate (10) has a number of molded in support surfaces which are arranged at given intervals and form downward pointing protrusions in the bottom plate (10). Each of the support surfaces holds a flooring connection profile (20), the cross section of which is smaller than that of the support surface.

11 Claims, 2 Drawing Sheets

STRUCTURAL COMPONENT FOR VEHICLE FLOORING

DESCRIPTION

Figure 2:
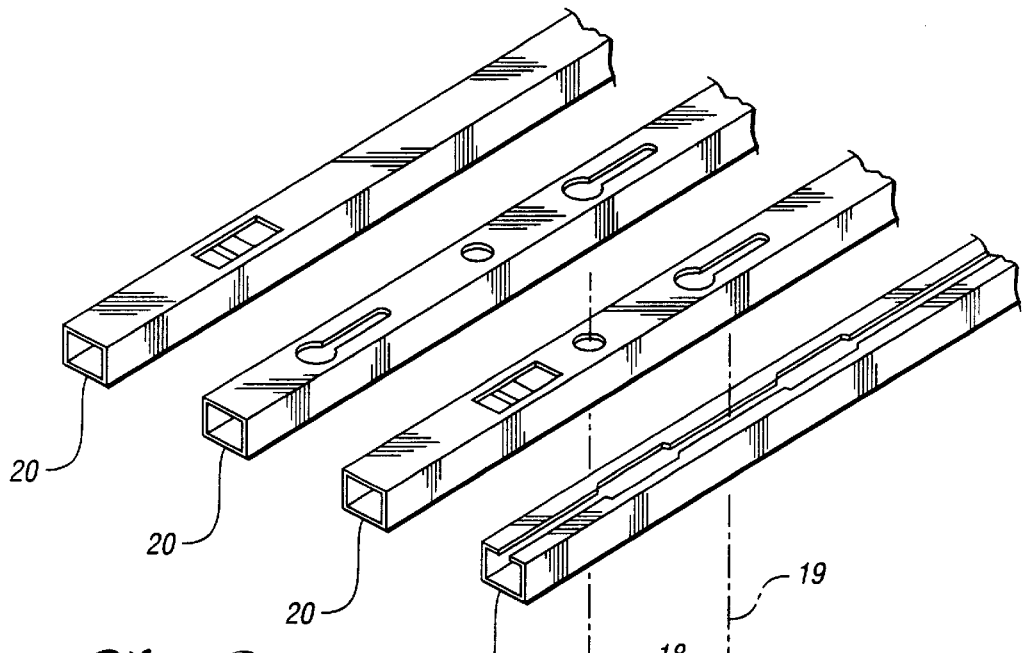

The invention concerns a structural component for vehicle flooring, particular for motor vehicles, consisting of a bottom plate and a number of profile parts for the attachment of equipment components to the floor.

This type of structural flooring components are known in various embodiments. Generally, the profile parts are screwed onto the bottom plate or are welded to it, in order to attach the respective equipment components, such as consoles for seating benches, individual seats or similar. A careful installation of the profile parts is required in order to attach them at the necessary distance from each other and with the required parallel placement if e.g., they are used for the sliding rail for vehicle seats.

The invention is based on the problem to suggest a structural flooring component of the above cited type which assures a particularly good versatility and a high degree of stability.

According to the invention, the solution to the problem consists of the fact that a structural flooring component of the type cited in the beginning is constructed in such a manner that the bottom plate contains a large number of built-in support surfaces which are constructed with their bottom side offset downward from the main surface of the bottom plate, and that the support surfaces hold in each case a flooring connection profile, of which the crosswise extension is smaller than that of the support surface.

The problem is solved in a satisfactory manner by the structural flooring component according to the invention. Due to the fact that the bottom plate has molded-in support surfaces for holding the flooring connection profiles, they can be installed in a particularly simple manner. In addition, such a structural flooring component has a particularly high degree of stability which is supported or even increased by the fact that the flooring connection profiles are connected to or into these molded-in support surfaces.

In a further development of the structural flooring component it is suggested that the support surfaces run at set intervals and possibly parallel and/or crosswise to each other. In this manner, the installation is made still simpler, as the orientation for the connecting flooring profiles is already provided.

A special embodiment of the structural flooring component provides that the support surfaces are formed by molded-in channels and hold, in each case, a connecting flooring profile with a cross section that fits into the cross section of the channel. With these measures, the rigidity of the structural flooring component is further increased as the result is an integral construction with the inserted flooring connection profiles.

In a further development of the invention it is provided that all the channels in the bottom plate have the same cross section along their whole length and that all the flooring connection profiles have the same complementary cross section.

These measures provide in a favorable manner a great variability for outfitting the structural flooring component, as the various flooring connection profiles can naturally be inserted into the respective channels as desired.

It is particularly advantageous if the cross section of the channels is quadrangular, particularly rectangular, and the able to accept within its space the flooring connection profiles, constructed as extruded section with adjustable or fixed length.

In this manner it is possible to very simply adjust the flooring connection profiles and to install them in the respective channels.

In a further development of the invention it is provided that the flooring connection profiles fit in an essentially flush manner with the main surface of the bottom plate. In this manner, a particularly compact arrangement is created which is essentially flat on its upper surface, that is particularly suitable as (expanded) loading platform, as transported goods will not be damaged by flooring connection profiles.

In a special embodiment of the structural flooring component according to the invention it is provided that the flooring connection profiles are designed as installation modules which have the same outline in their cross section, particularly rectangular or trapeze shaped, and which provide on their support surface, i.e., the top side away from the channel, various openings for attaching the various equipment components.

The trapeze shaped cross section can expand in the direction of the top side if an interlocking insertion of the flooring connection profiles is desired. Alternatively, it is possible for the trapeze shaped cross section to taper towards the top side, so that the flooring connection profiles obtain a stable support surface which sits flatly on the support surface.

In a further development of such a structural flooring component it is provided that the openings on the top side of the flooring connection profiles are rectangular, slot shaped, round or key hole shaped and, if necessary, provided with tie-down eyelets.

Using these measures a large variation of equipment components or transport goods can be attached in a favorable manner.

In one embodiment of the structural flooring component according to the invention it is provided that the flooring connection profiles are permanently attached to the bottom plate, e.g., by welding. In another preferred embodiment of the structural flooring component according to the invention it is provided that the flooring connection profiles are attached to the bottom plate in a removable manner, e.g., by means of screws. In this latter case it is possible to exchange the flooring connection profiles at any time to satisfy possibly changing requirements as may occur in actual use. In this manner, the variability of use is further enhanced.

In a special embodiment of the invention it is provided that the bottom areas of the channels have threaded borings which permit the installation of flooring connection profiles by means of screws, whereby the screw heads can, if necessary, be countersunk on the inside of the flooring connection profiles. In this manner, a particularly compact module with high rigidity is attained without the attachment screws providing an undesirable intrusion.

In another special embodiment of the structural flooring component it is provided that the flooring connection profiles are attached to the bottom plate by means of cross-sections, each of which will extend across a channel with inserted flooring connection profile and is screwed onto the bottom plate in the areas next to the channels. In such an embodiment, the screws are accommodated in the available space next to the channels.

In another special embodiment of the structural flooring component according to the invention it is provided that the channels have threaded bolts protruding towards the main surface of the bottom plate which can be attached through the corresponding openings in the floor of the flooring connection profiles with nuts applied there. With such an embodiment it is easy the adjust the flooring connection profiles and to fasten them in the desired position, whereby, in this case, the nuts and the bolts can be accommodated within the inside space of the flooring connection profiles.

The structural flooring component according to the invention is suitable, e.g, for passenger cars or station wagons in which seats, consoles or components for tradesmen's vehicles have to be attached. The channels in the bottom plate are provided either in the lengthwise direction of the vehicle or in a crosswise direction of the vehicle. The structural flooring component is equally suited for transport vehicles, such as moving vans or similar, as the structural flooring component has a high degree of rigidity, provides a high degree of variability due to its modular design and also gives a great variety of attachment possibilities without hindering or even damaging the transported goods during loading, unloading or transport.

Figure 3:
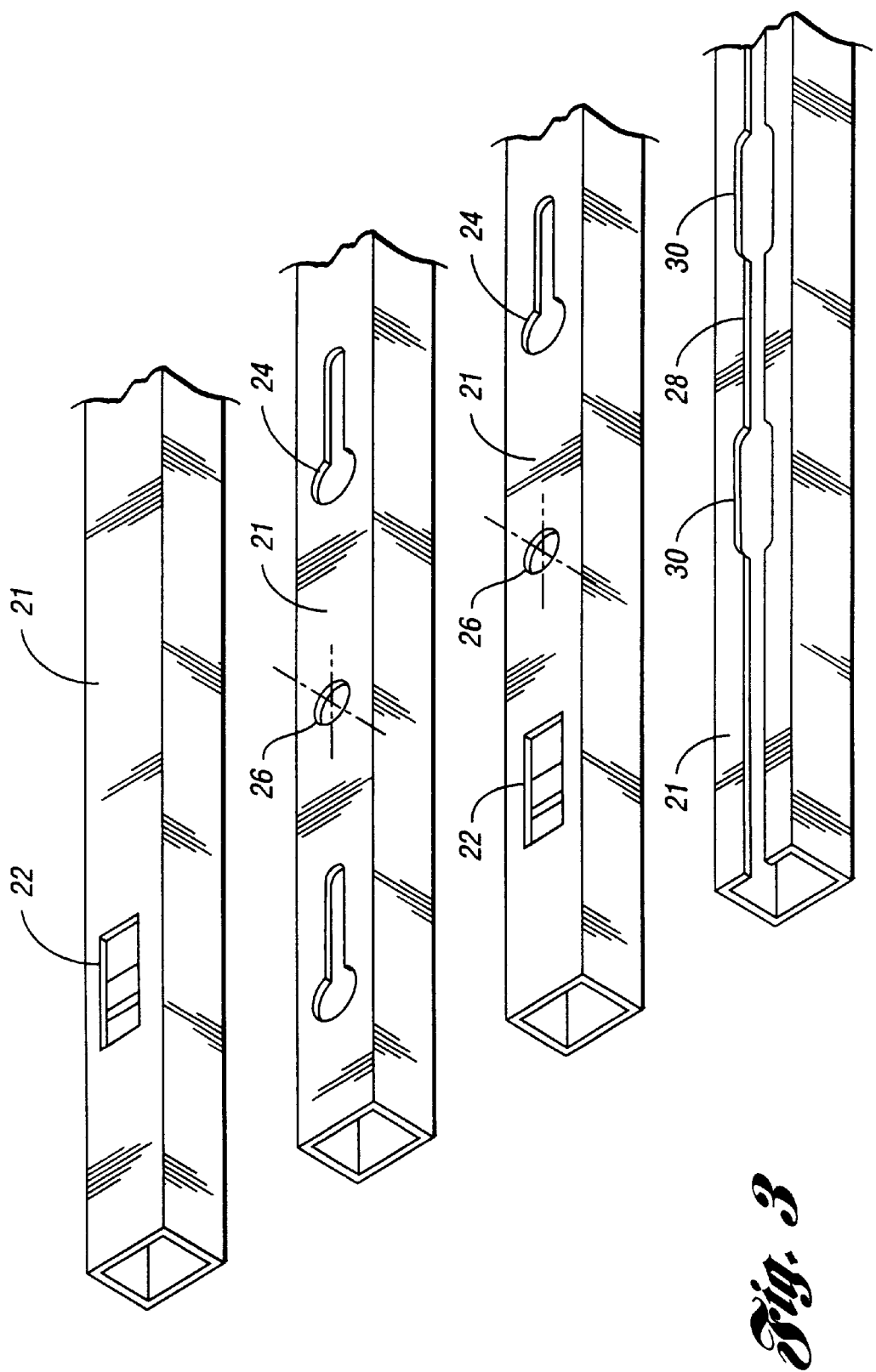

In the following, the invention is further explained, also with regard to other characteristics and advantages, based on the description of embodiments and making reference to the enclosed drawings. The drawings show in FIG. 1 a schematic, perspective representation of a bottom plate for the structural flooring component according to the invention;

FIG. 2 a perspective representation of various flooring connection profiles for insertion into the bottom plate for the structural flooring component according to the invention; and in FIG. 3 enlarged representations of various flooring connection profiles to be used with the structural flooring component according to the invention.

Figure 1:
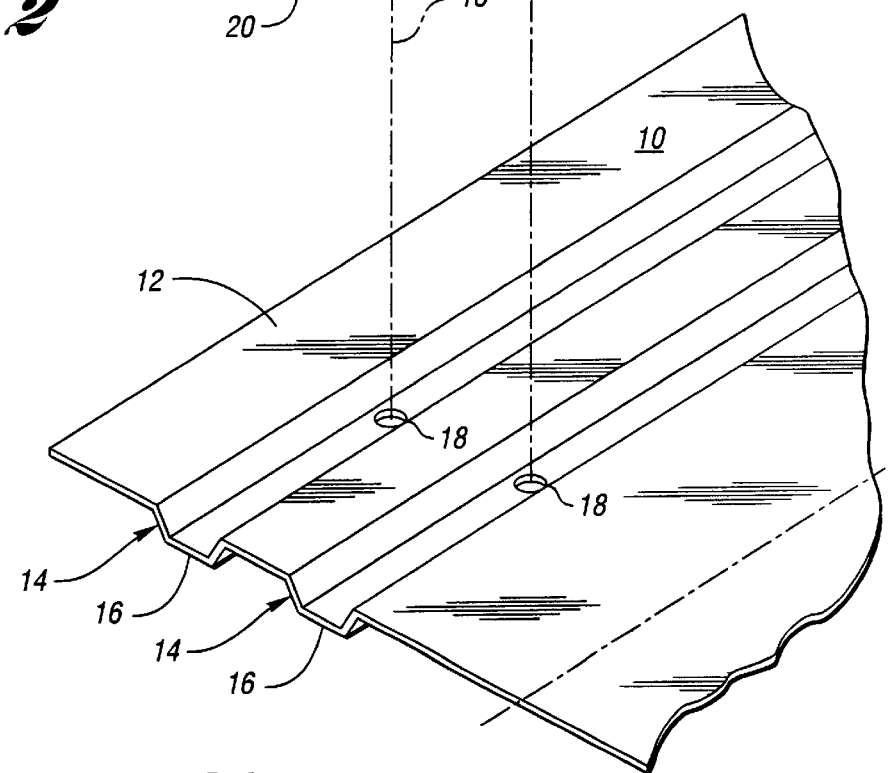

FIG. 1 shows a bottom plate 10, showing a number of molded in support surfaces which are formed with their bottom 16 offset downward against the main surface 12 of the bottom plate 10. Each of these support surfaces accepts a flooring connection profile 20 of which the crosswise extension is smaller than that of the support surface.

Depending on the prevailing conditions, the support surfaces are designed at given intervals and run parallel and/or perpendicular to each other in order to accept long flooring connection profiles 20, which may, as needed, have extensions perpendicular to the lengthwise extension or, in top view, T-shaped or L-shaped configurations.

Such support surfaces are suitably formed by molded-in channels 14 which accept each one flooring connection profile 20 with a cross section that fits into the cross section of the channel 14. With such a bottom plate 10 it is possible to form the channels in such a manner that they are evenly offset downward, but this is not an absolute requirement.

In the arrangement according to FIG. 1, only two such channels 14 are indicated, but it is certainly possible to have a larger number of such channels 14, e.g., six or eight such channels 14 for a passenger vehicle, when considering, e.g., the furnishings of a minibus or a so-called van.

It is naturally possible that such channels 14 also have perpendicular extensions into which reach corresponding perpendicular extensions of the bottom connection profiles 20. In this manner a tight seal of the flooring connection profiles 20 in the respective channels is assured.

As indicated in FIG. 1 and 2 by means of the dot-dash lines, the channels 14 are designed to hold the respective flooring connection profiles 20 which have a cross section that fits into the cross section of the respective channels 14.

In order to attain great versatility in actual use, it is suitable that all channels 14 in the bottom plate 10 are formed with the same cross section along their full length while all the flooring connection profiles 20 have the same complementary cross section. In this manner it is possible to install any desired flooring connection profile into the desired channel 14.

As indicated in FIG. 1, the channels 14 have a quadrangular cross section, particularly a rectangular one in order to accept the flooring connection profiles 20 in their inside space. The latter are preferably designed as extruded sections which, as needed, can be cut to a certain length and inserted into the channel 14.

The channels 14 and the flooring connection profiles 20 may have a trapeze-shaped form in order to attain a tight connection between them However, in many cases it may be suitable to use flooring connection profiles with a rectangular cross section, of which the perpendicular dimension is a little smaller than the inside measurement of the channels 14. In this case, greater tolerances can be accepted for the molded bottom plate, as there is the possibility to even out such tolerances during the installation of the flooring connection profiles 20 and to adjust and fasten them, with regard to their distance and parallel seating to the desired degree of precision.

In another embodiment, not shown here, it is provided that the flooring connection profiles have a trapeze shaped cross section, whereby their base is wider than the top side 21 of the flooring connection profile 20. In this manner flooring connection profiles of high rigidity are obtained, where on their side grooves are open after they are installed, which can be used, e.g., to hold complementary profiles of floor coverings.

It is suitable to plan the dimensions of the channels 14 and the flooring connection profiles 20 in such a manner that the flooring connection profiles 20, when installed, have their top side 21 essentially flush with the main surface 12 of the bottom plate 10. The result is thus a continuous flat surface of the structural flooring component, which is of particular advantage for loading and transport surfaces.

As is indicated schematically in FIG. 2, the flooring connection profiles 20 are constructed as installation modules, thus interchangeable, whereby they all have the same shape in their cross section, in particular a rectangular shape and various openings, 22, 24, 26, 28 and 30 on their top side 21 that points away from the channel 14, in order to attach there various equipment components.

As shown in FIG. 3, these openings 22 to 30 on the top side 21 of the flooring connection profile 21 may have different shapes. As examples, one can see tie-down eyelets 22, which are openings in which a bolt extends perpendicularly through the inside space of the flooring connection profile 20 so that it is possible to attach, e.g., a rope or a hook. Shown in addition are keyhole shaped openings 24, round openings 26, slit shaped openings 28 and rectangular openings 30. Such openings are used for the insertion, hanging or squeezing in of various equipment components. It is certainly possible that these openings may also have other geometric shapes that are not shown here.

If desired, the flooring connection profiles 20 can be firmly and permanently mounted into the respective channels 14, e.g. by welding, after the respective flooring connection profile 20 has been adjusted accordingly.

However, considering the particularly extensive variability and a modular interchangeability, it appears to be suitable to attach the flooring connection profiles 20 in a removable manner to the bottom plate 10, particularly by means of screws. The screw setting can be constructed in various ways.

In a special embodiment, as shown schematically in FIG. 1, threaded borings 18 are provided in the bottom areas of the channels 14, which are designed to hold not shown attachment screws for the installation of the flooring connection profiles 20. This is shown by broken lines 19 in FIG. 1 and FIG. 2, indicating a connection between the bottom plate 10 and the flooring connection profiles 20. The heads of the attachment screws can then be held countersunk in the inside space of the flooring connection profiles 20, so that the top side of the flooring connection profiles 20 remains flat. Should that not be possible for certain reasons, the attachment screws may also be inserted in such a manner that their head is placed on the top side 21 of the flooring connection profiles 20 and thus protruding only slightly.

In another embodiment, the attachment of the flooring connection profile 20 can take place in such a manner that the crosswise profiles are attached to the bottom plate 10, while they bridge at least one channel 14 with inserted flooring connection profile 20 and which are then screwed into the pulled up areas of the bottom plate 10 next to the channels 14.

A third type of attachment consists of providing the channels 14 with not shown threaded bolts which protrude from the bottom 16 to the main surface 12 of the bottom plate 10 and then protrude through the corresponding openings in the bottom of the flooring connection profile 20. The flooring connection profiles 20 are then attached to these threaded bolts by means of nuts.

For all the embodiments described above it is suitable that the openings for the attachment screws in the flooring connection profiles 20 have a slightly larger diameter than the cross section of the screws or are constructed as slot in order to assure the ability to adjust for exact installation of the flooring connection profiles 20 in the bottom plate 10.

We claim:

1. Structural flooring component for vehicles with a bottom plate (10) and a number of profile parts (20) for the attachment of equipment components to the floor, characterized by the fact that the bottom plate (10) has a number of molded-in support surfaces which are formed with their bottom (16) offset downward from the main surface (12) of the bottom plate (10), and that the support surfaces hold in each case a profile part (20), the crosswise extension of which is smaller than that of the support surface, and wherein the profile parts (20) are constructed as installation modules which have as their cross section the same rectangular shape, and which have on their support surface, i.e. the top (21) side facing away from the channel (14), various openings (22 to 30) for the attachment of various equipment components.

2. Structural flooring component according to claim 1, characterized by the fact
that the support surfaces run at set intervals and as needed parallel or perpendicular to each other.

3. Structural flooring component according to claim 1, characterized by the fact
that the support surfaces are formed by molded-in channels (14) and hold, in each case one flooring connection profile (20) which has a cross section that fits into the cross section of the channel (14).

4. Structural flooring component according to claim 3, characterized by the fact
that all the channels (14) in the bottom plate (10) have the same cross section along their total length
and that all flooring connection profiles (20) have the same complementary cross section.

5. Structural flooring component according to claim 3, characterized by the fact
that the channels (14) are shaped rectangularly and accept in their inside flooring connection profiles (20) constructed as extruded profiles with an adjustable or fixed length.

6. Structural flooring component according to claim 1, characterized by the fact
that the flooring connection profiles (20), when installed, have their top side (21) essentially flush with the main surface (12) of the bottom plate (10).

7. Structural flooring component according to claim 1, characterized by the fact that the openings (22 to 30) on the top side (21) of the flooring connection profiles (20) are shaped rectangular (30), as slits (28), round (26) or as keyholes (24) and are equipped with tie down eyelets (22).

8. Structural flooring component according to claim 1, characterized by the fact that the flooring connection profiles (20) can be attached to the bottom plate (10) permanently or in a removable manner.

9. Structural flooring component according to claim 8, characterized by the fact
that the bottom areas of the channels (14) are provided with threaded borings (18) which hold attachment screws for attaching the flooring connection profiles (20), whereby the heads of the attachment screws are countersunk in the inside space of the flooring connection profiles (20).

10. Structural flooring component according to claim 8, characterized by the fact
that the channels (14) have threaded bolts protruding towards the main surface (12) of the bottom plate (10) in such a manner that the flooring connection profiles (20) are attached by means of attached nuts which are countersunk in the inside space of the flooring connection profiles (20).

11. A structural flooring component for vehicles, with a bottom plate (10) and a number of profile parts (20) for the attachment of equipment components to the floor, characterized by the fact that the bottom plate (10) has a number of molded-in support surfaces which are formed with their bottom (16) offset downward from the main surface (12) of the bottom plate (10), and that the support surfaces hold in each case a profile part (20), the crosswise extension of which is smaller than that of the support surface; and wherein the profile parts (20) are constructed as installation modules which have as their cross section the same trapeze-shaped form, and which have on their support surface, i.e., the top (21) side facing away from the channel (14), various openings (22 to 30) for the attachment of various equipment components.

* * * * *

UNITED STATES PATENT AND TRADEMARK OFFICE
CERTIFICATE OF CORRECTION

PATENT NO. : 6,182,411 B1
DATED : February 6, 2001
INVENTOR(S) : Antje Ganser

It is certified that error appears in the above-identified patent and that said Letters Patent is hereby corrected as shown below:

Title page,
Please list the priority document as follows:

German Application No. 198 05 284.7-42

Signed and Sealed this

Seventh Day of August, 2001

Attest:

NICHOLAS P. GODICI
Attesting Officer     Acting Director of the United States Patent and Trademark Office